(12) United States Patent
Si

(10) Patent No.: US 11,947,077 B2
(45) Date of Patent: Apr. 2, 2024

(54) CAMERA OPTICAL LENS

(71) Applicant: Changzhou Raytech Optronics Co., Ltd., Changzhou (CN)

(72) Inventor: Congfang Si, Shenzhen (CN)

(73) Assignee: Changzhou Raytech Optronics Co., Ltd., Changzhou (CN)

( * ) Notice: Subject to any disclaimer, the term of this patent is extended or adjusted under 35 U.S.C. 154(b) by 659 days.

(21) Appl. No.: 17/134,165

(22) Filed: Dec. 25, 2020

(65) Prior Publication Data
US 2022/0066153 A1 Mar. 3, 2022

(30) Foreign Application Priority Data
Sep. 3, 2020 (CN) .......................... 202010916864.3

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .... G02B 13/001; G02B 13/002; G02B 13/04; G02B 13/0045; G02B 13/06; G02B 13/18; G02B 9/64; G02B 15/1461; G02B 15/173; G02B 15/28; G02B 27/0025; H04N 23/55
USPC .................................................. 359/708–718
See application file for complete search history.

(56) References Cited

U.S. PATENT DOCUMENTS

| | | | |
|---|---|---|---|
| 2017/0090164 A1* | 3/2017 | Yamada | G02B 15/145125 |
| 2022/0066148 A1* | 3/2022 | Zhao | G02B 13/0045 |
| 2022/0066160 A1* | 3/2022 | Meng | G02B 13/0045 |
| 2022/0066161 A1* | 3/2022 | Sun | G02B 9/64 |
| 2022/0066162 A1* | 3/2022 | Guo | G02B 13/0045 |
| 2022/0066163 A1* | 3/2022 | Yu | G02B 9/64 |

FOREIGN PATENT DOCUMENTS

| | | |
|---|---|---|
| CN | 111766687 A1 | 10/2020 |
| JP | H0271220 A1 | 3/1990 |
| JP | H05100166 A1 | 4/1993 |
| JP | H0876015 A1 | 3/1996 |
| JP | 2000162500 A1 | 6/2000 |
| JP | 2002098894 A1 | 4/2002 |
| JP | 2009008975 A1 | 1/2009 |
| JP | WO2014046126 A1 | 8/2016 |

* cited by examiner

*Primary Examiner* — Nicholas R. Pasko
*Assistant Examiner* — Samanvitha Sridhar
(74) *Attorney, Agent, or Firm* — W&G Law Group

(57) ABSTRACT

A camera optical lens is provided. The camera optical lens includes, from an object side to an image side, a first lens having a positive refractive power, a second lens having a negative refractive power, a third lens, a fourth lens, a fifth lens, a sixth lens, a seventh lens, an eighth lens, and a ninth lens. The camera optical lens satisfies following conditions: $2.00 \leq f1/f \leq 5.00$, and $2.00 \leq d3/d4 \leq 10.00$, where f denotes a focal length of the camera optical lens, f1 denotes a focal length of the first lens, d3 denotes an on-axis thickness of the second lens, and d4 denotes an on-axis distance from an image side surface of the second lens to an object side surface of the third lens. The camera optical lens according to the present disclosure meets design requirements for large aperture, wide angle and ultra-thinness while having good optical performance.

11 Claims, 9 Drawing Sheets

CAMERA OPTICAL LENS

TECHNICAL FIELD

The present disclosure relates to the field of optical lenses, and in particular, to a camera optical lens applicable to portable terminal devices such as smart phones or digital cameras, and camera devices such as monitors or PC lenses.

BACKGROUND

With the emergence of smart phones in recent years, the demand for miniature camera lens has been increased. However, a photosensitive device of general camera lens is either a Charge Coupled Device (CCD) or a Complementary Metal-Oxide Semiconductor Sensor (CMOS Sensor). With the progress of the semiconductor manufacturing technology, the pixel size of the photosensitive device becomes smaller. In addition, the current electronic products have been developed to have better functions and lighter and smaller dimensions. Therefore, a miniature camera lens with good imaging quality has already become a mainstream in the current market.

In order to obtain better imaging quality, a traditional lens equipped in a mobile phone camera usually adopts a three-piece or four-piece structure, or even five-piece or six-piece structure. However, with the development of technologies and the increase of the various demands of users, a nine-piece structure gradually appears in lens designs as the pixel area of the photosensitive devices is constantly reduced and the requirement of the system on the imaging quality is constantly improved. Although the common nine-piece lens already has better optical performance, its settings on refractive power, lens spacing, and lens shape are still unreasonable to some extent. As a result, the lens structure cannot meet design requirements for ultra-thin, wide-angle lenses having a big aperture while achieving a good optical performance.

SUMMARY

In view of the above problems, the present disclosure provides a camera optical lens, which meets design requirements for large aperture, ultra-thinness and wide angle while achieving good optical performance.

In an embodiment, the present disclosure provides a camera optical lens. The camera optical lens includes, from an object side to an image side, a first lens having a positive refractive power, a second lens having a negative refractive power, a third lens, a fourth lens, a fifth lens, a sixth lens, a seventh lens, an eighth lens, and a ninth lens. The camera optical lens satisfies following conditions: $2.00 \le f1/f \le 5.00$; and $2.00 \le d3/d4 \le 10.00$, where f denotes a focal length of the camera optical lens, f1 denotes a focal length of the first lens, d3 denotes an on-axis thickness of the second lens, and d4 denotes an on-axis distance from an image side surface of the second lens to an object side surface of the third lens.

As an improvement, the camera optical lens further satisfies a condition of $1.50 \le f6/f \le 5.00$, where f6 denotes a focal length of the sixth lens.

As an improvement, the camera optical lens further satisfies following conditions: $-22.67 \le (R1+R2)/(R1-R2) \le -3.33$; and $0.03 \le d1/TTL \le 0.09$, where R1 denotes a central curvature radius of an object side surface of the first lens, R2 denotes a central curvature radius of an image side surface of the first lens, d1 denotes an on-axis thickness of the first lens, and TTL denotes a total optical length from the object side surface of the first lens to an image plane of the camera optical lens along an optic axis.

As an improvement, the camera optical lens further satisfies following conditions: $f2/f \le -2.39$; $3.19 \le (R3+R4)/(R3-R4) \le 60.59$; and $0.02 \le d3/TTL \le 0.11$, where f2 denotes a focal length of the second lens, R3 denotes a central curvature radius of an object side surface of the second lens, R4 denotes a central curvature radius of the image side surface of the second lens, and TTL denotes a total optical length from an object side surface of the first lens to an image plane of the camera optical lens along an optic axis.

As an improvement, the camera optical lens further satisfies following conditions: $-28.31 \le (R5+R6)/(R5-R6) \le -3.51$; and $0.02 \le d5/TTL \le 0.06$, where f3 denotes a focal length of the third lens, R5 denotes a central curvature radius of the object side surface of the third lens, R6 denotes a central curvature radius of an image side surface of the third lens, d5 denotes an on-axis thickness of the third lens, and TTL denotes a total optical length from an object side surface of the first lens to an image plane of the camera optical lens along an optic axis.

As an improvement, the camera optical lens further satisfies following conditions: $-57.47 \le f4/f \le 27.56$; $-35.82 \le (R7+R8)/(R7-R8) \le 28.73$; and $0.01 \le d7/TTL \le 0.04$, where f4 denotes a focal length of the fourth lens, R7 denotes a central curvature radius of the object side surface of the fourth lens, R8 denotes a central curvature radius of an image side surface of the fourth lens, d7 denotes an on-axis thickness of the fourth lens, and TTL denotes a total optical length from an object side surface of the first lens to an image plane of the camera optical lens along an optic axis.

As an improvement, the camera optical lens further satisfies following conditions: $-81.41 \le f5/f \le 37.80$; $-12.49 \le (R9+R10)/(R9-R10) \le 20.10$; and $0.02 \le d9/TTL \le 0.09$, where f5 denotes a focal length of the fifth lens, R9 denotes a central curvature radius of an object side surface of the fifth lens, R10 denotes a central curvature radius of an image side surface of the fifth lens, d9 denotes an on-axis thickness of the fifth lens, and TTL denotes a total optical length from an object side surface of the first lens to an image plane of the camera optical lens along an optic axis.

As an improvement, the camera optical lens further satisfies following conditions: $-1.81 \le (R11+R12)/(R11-R12) \le 2.00$; and $0.04 \le d11/TTL \le 0.13$, where R11 denotes a central curvature radius of an object side surface of the sixth lens, R12 denotes a central curvature radius of an image side surface of the sixth lens, d11 denotes an on-axis thickness of the sixth lens, and TTL denotes a total optical length from an object side surface of the first lens to an image plane of the camera optical lens along an optic axis.

As an improvement, the camera optical lens further satisfies following conditions: $-4.45 \le f7/f \le -0.50$; $0.64 \le (R13+R14)/(R13-R14) \le 3.64$; and $0.03 \le d13/TTL \le 0.15$, where f7 denotes a focal length of the seventh lens, R13 denotes a central curvature radius of an object side surface of the seventh lens, R14 denotes a central curvature radius of an image side surface of the seventh lens, d13 denotes an on-axis thickness of the seventh lens, and TTL denotes a total optical length from an object side surface of the first lens to an image plane of the camera optical lens along an optic axis.

As an improvement, the camera optical lens further satisfies following conditions: $0.28 \le f8/f \le 1.31$; $-2.51 \le (R15+R16)/(R15-R16) \le -0.75$; and $0.04 \le d15/TTL \le 0.12$, where f8 denotes a focal length of the eighth lens, R15 denotes a central curvature radius of an object side surface of the eighth lens, R16 denotes a central curvature radius of an image side surface of the eighth lens, d15 denotes an on-axis thickness of the eighth lens, and TTL denotes a total optical length from an object side surface of the first lens to an image plane of the camera optical lens along an optic axis.

As an improvement, the camera optical lens further satisfies following conditions: $-1.51 \leq f9/f \leq -0.48$; $0.27 \leq (R17+R18)/(R17-R18) \leq 0.98$; and $0.04 \leq d17/TTL \leq 0.12$, where f9 denotes a focal length of the ninth lens, R17 denotes a central curvature radius of an object side surface of the ninth lens, R18 denotes a central curvature radius of an image side surface of the ninth lens, d17 denotes an on-axis thickness of the ninth lens, and TTL denotes a total optical length from an object side surface of the first lens to an image plane of the camera optical lens along an optic axis.

The present disclosure has the following beneficial effects. The camera optical lens according to the present disclosure has excellent optical performance while achieving the characteristics of large aperture, wide angle and ultra-thinness, particularly applicable to camera lens assembly of mobile phones and WEB camera lenses composed of CCD, CMOS, and other camera elements for high pixels.

BRIEF DESCRIPTION OF DRAWINGS

In order to clearly illustrate technical solutions in embodiments of the present disclosure, the accompanying drawings used in the embodiments are briefly introduced as follows. It is apparent that the drawings described below are merely part of the embodiments of the present disclosure. Other drawings can also be acquired by those of ordinary skill in the art without involving inventive steps. In the drawings.

DESCRIPTION OF EMBODIMENTS

Embodiments of the present disclosure will hereinafter be described in detail with reference to the accompanying drawings so as to make the purpose, technical solutions, and advantages of the present disclosure more apparent. However, those of skilled in the art can understand that many technical details described hereby in each embodiment of the present disclosure is only to provide a better comprehension of the present disclosure. Even without these technical details and various changes and modifications based on the following embodiments, the technical solutions of the present disclosure can also be implemented.

Embodiment 1

Figure 1:
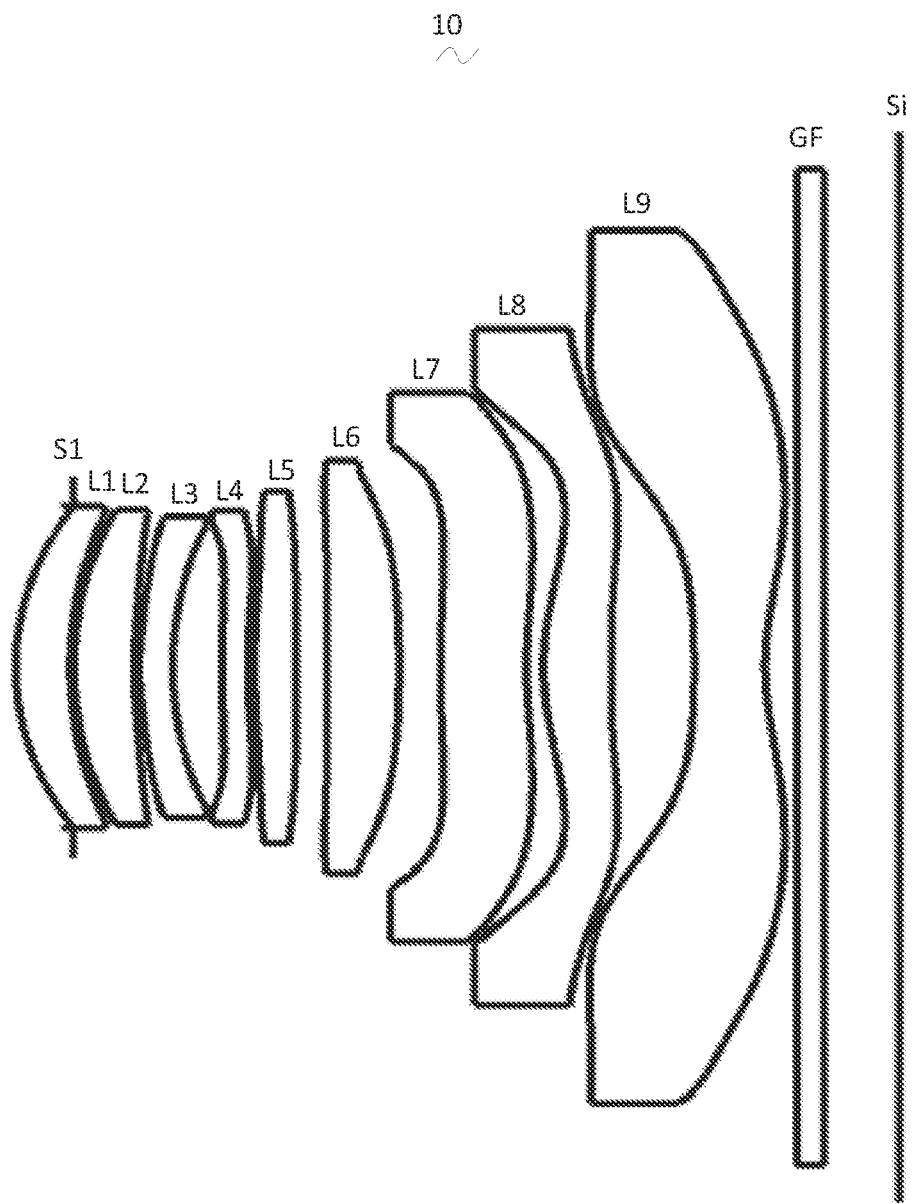
FIG. 1 is a schematic structural diagram of a camera optical lens according to Embodiment 1 of the present disclosure.

Referring to the drawings, the present disclosure provides a camera optical lens 10. FIG. 1 illustrates the camera optical lens 10 according to Embodiment 1 of the present disclosure. The camera optical lens 10 includes nine lenses. Specifically, the camera optical lens 10 successively includes, from an object side to an image side, an aperture S1, a first lens L1, a second lens L2, a third lens L3, a fourth lens L4, a fifth lens L5, a sixth lens L6, a seventh lens L7, an eighth lens L8, and a ninth lens L9. An optical element such as an optical filter GF may be provided between the ninth lens L9 and an image plane S1.

In this embodiment, the first lens L1 has a positive refractive power, the second lens L2 has a negative refractive power, the third lens L3 has a positive refractive power, the fourth lens L4 has a negative refractive power, the fifth lens L5 has a positive refractive power, the sixth lens L6 has a positive refractive power, the seventh lens L7 has a negative refractive power, the eighth lens L8 has a positive refractive power, and the ninth lens L9 has a negative refractive power. It should be appreciated that in other embodiments, the third lens L3, the sixth lens L6, the seventh lens L7, the eighth lens L8, and the ninth lens L9 may also have other refractive power.

In this embodiment, the first lens L1 is made of a plastic material, the second lens L2 is made of a plastic material, the third lens L3 is made of a plastic material, the fourth lens L4 is made of a plastic material, the fifth lens L5 is made of a plastic material, the sixth lens L6 is made of a plastic material, the seventh lens L7 is made of a plastic material, the eighth lens L8 is made of a plastic material, and the ninth lens L9 is made of a plastic material. In other embodiments, each of the lenses may also be made of other material.

In this embodiment, a focal length of the camera optical lens 10 is defined as f, and a focal length of the first lens L1 is defined as f1. The camera optical leans 10 satisfies a condition of $2.00 \leq f1/f \leq 5.00$, which specifies a ratio of the focal length of the first lens to a total focal length of the system. When the condition is satisfied, spherical aberration and field curvature of the system can be effectively balanced.

An on-axis thickness of the second lens L2 is defined as d3, and an on-axis distance from an image side surface of the second lens L2 to an object side surface of the third lens L3 is defined as d4. The camera optical leans 10 satisfies a condition of $2.00 \leq d3/d4 \leq 10.00$, which specifies a ratio of the on-axis thickness of the second lens L2 to an air gap between the second lens and the third lens. This condition facilitates reducing a total length of the optical system, thereby achieving an ultra-thin effect. As an example, the camera optical leans 10 satisfies a condition of $2.13 \leq d3/d4 \leq 9.93$.

A focal length of the sixth lens is defined as f6. The camera optical leans 10 satisfies a condition of $1.50 \leq f6/f \leq 5.00$, which specifies a ratio of the focal length of the sixth lens L6 to the total focal length of the system. The system therefore achieves a better imaging quality and a lower sensitivity by reasonably distributing the refractive power.

In this embodiment, an object side surface of the first lens L1 is a convex surface at a paraxial position, and an image side surface of the first lens L1 is a concave surface at the paraxial position.

A central curvature radius of the object side surface of the first lens L1 is defined as R1, and a central curvature radius of the image side surface of the first lens L1 is defined as R2. The camera optical leans 10 satisfies a condition of $-22.67 \leq (R1+R2)/(R1-R2) \leq -3.33$. This condition can reasonably control a shape of the first lens L1, such that the first lens L1 can effectively correct spherical aberration of the system. As an example, the camera optical leans satisfies a condition of $-14.17 \leq (R1+R2)/(R1-R2) \leq -4.16$.

An on-axis thickness of the first lens L1 is defined as d1, and a total optical length of the camera optical lens 10 is defined as TTL. The camera optical leans 10 satisfies a condition of $0.03 \leq d1/TTL \leq 0.09$. This condition can facilitate achieving ultra-thin lenses. As an example, the camera optical leans 10 satisfies a condition of $0.04 \leq d1/TTL \leq 0.07$.

In this embodiment, an object side surface of the second lens L2 is a convex surface at the paraxial position, and an image side surface of the second lens L2 is a concave surface at the paraxial position.

A focal length of the camera optical lens 10 is defined as f, and a focal length of the second lens L2 is defined as f2. The camera optical leans 10 satisfies a condition of $f2/f \leq -2.39$. This condition can facilitate aberration correction of the optical system by controlling a positive refractive power of the second lens L2 within a reasonable range. As an example, the camera optical leans 10 satisfies a condition of $f2/f \leq -2.98$.

A central curvature radius of the object side surface of the second lens L2 is defined as R3, and a central curvature radius of the image side surface of the second lens L2 is defined as R4. The camera optical leans 10 satisfies a condition of $3.19 \leq (R3+R4)/(R3-R4) \leq 60.59$, which specifies a shape of the second lens L2. This condition can facilitate correcting the on-axis aberration with development of ultra-thin and wide-angle lenses. As an example, the camera optical leans 10 satisfies a condition of $5.10 \leq (R3+R4)/(R3-R4) \leq 48.47$.

An on-axis thickness of the second lens L2 is defined as d3, and the total optical length of the camera optical lens 10 is defined as TTL. The camera optical leans 10 satisfies a condition of $0.02 \leq d3/TTL \leq 0.11$. This condition can achieve ultra-thin lenses. As an example, the camera optical leans 10 satisfies a condition of $0.04 \leq d3/TTL \leq 0.08$.

In this embodiment, an object side surface of the third lens L3 is a convex surface at the paraxial position, and the image side surface of the third lens L3 is a concave surface at the paraxial position.

The focal length of the camera optical lens 10 is defined as f, and a focal length of the third lens L3 is defined as f3. The camera optical leans 10 satisfies a condition of The system therefore achieves a better imaging quality and a lower sensitivity by reasonably distributing the refractive power. As an example, the camera optical leans 10 satisfies a condition of $1.44 \leq f3/f \leq 5.17$.

A central curvature radius of the object side surface of the third lens L3 is defined as R5, and a central curvature radius of an image side surface of the third lens L3 is defined as R6. The camera optical leans 10 satisfies a condition of $-28.31 \leq (R5+R6)/(R5-R6) \leq -3.51$, which specifies a shape of the third lens. This condition can alleviate the deflection of light passing through the lens, thereby effectively reducing the aberration. As an example, the camera optical leans 10 satisfies a condition of $-17.70 \leq (R5+R6)/(R5-R6) \leq -4.39$.

An on-axis thickness of the third lens L3 is defined as d5, and the total optical length of the camera optical lens 10 is defined as TTL. The camera optical leans 10 satisfies a condition of $0.02 \leq d5/TTL \leq 0.06$. This condition can achieve ultra-thin lenses. As an example, the camera optical leans 10 satisfies a condition of $0.03 \leq d5/TTL \leq 0.05$.

In this embodiment, the object side surface of the fourth lens L4 is a convex surface at the paraxial position, and an image side surface of the fourth lens L4 is a concave surface at the paraxial position.

The focal length of the camera optical lens 10 is defined as f, and a focal length of the fourth lens L4 is defined as f4. The camera optical leans 10 satisfies a condition of $-57.47 \leq f4/f \leq 27.56$. The system therefore achieves a better imaging quality and a lower sensitivity by reasonably distributing the refractive power. As an example, the camera optical leans 10 satisfies a condition of $-35.92 \leq f4/f \leq 22.05$.

A central curvature radius of the object side surface of the fourth lens L4 is defined as R7, and a central curvature radius of the image side surface of the fourth lens L4 is defined as R8. The camera optical leans 10 satisfies a condition of $-35.82 \leq (R7+R8)/(R7-R8) \leq 28.73$, which specifies a shape of the fourth lens L4. This condition can facilitate aberration correction of an off-axis angle of view with development of ultra-thin and wide-angle lenses. As an example, the camera optical leans 10 satisfies a condition of $-22.39 \leq (R7+R8)/(R7-R8) \leq 22.98$.

An on-axis thickness of the fourth lens L4 is defined as d7, and the total optical length of the camera optical lens 10 is defined as TTL. The camera optical leans 10 satisfies a condition of $0.01 \leq d7/TTL \leq 0.04$. This condition can achieve ultra-thin lenses. As an example, the camera optical leans 10 satisfies a condition of $0.02 \leq d7/TTL \leq 0.03$.

In this embodiment, an object side surface of the fifth lens L5 is a convex surface at the paraxial position, and an image side surface thereof is a convex surface at the paraxial position.

The focal length of the camera optical lens 10 is defined as f, and a focal length of the fifth lens L5 is defined as f5. The camera optical leans 10 satisfies a condition of $-81.41 \leq f5/f \leq 37.80$. The fifth lens L5 is limited to effectively make a light angle of the camera lens gentle and reduce the tolerance sensitivity. As an example, the camera optical leans 10 satisfies a condition of $-50.88 \leq f5/f \leq 30.24$.

A central curvature radius of the object side surface of the fifth lens L5 is defined as R9, and a central curvature radius of the image side surface of the fifth lens L5 is defined as R10. The camera optical leans 10 satisfies a condition of $-12.49 \leq (R9+R10)/(R9-R10) \leq 20.10$, which specifies a shape of the fifth lens L5. This condition can facilitate aberration correction of an off-axis angle of view with development of ultra-thin and wide-angle lenses. As an example, the camera optical leans 10 satisfies a condition of $-7.81 \leq (R9+R10)/(R9-R10) \leq 16.08$.

An on-axis thickness of the fifth lens L5 is defined as d9, and the total optical length of the camera optical lens 10 is defined as TTL. The camera optical leans 10 satisfies a condition of $0.02 \leq d9/TTL \leq 0.09$. This condition can achieve ultra-thin lenses. As an example, the camera optical leans 10 satisfies a condition of $0.04 \leq d9/TTL \leq 0.07$.

In this embodiment, the object side surface of the sixth lens L6 is a concave surface at the paraxial position, and the image side surface of the sixth lens L6 is a convex surface at the paraxial position.

A central curvature radius of the object side surface of the sixth lens L6 is defined as R11, and a central curvature radius of the image side surface of the sixth lens L6 is defined as R12. The camera optical leans 10 satisfies a condition of $-1.81 \leq (R11+R12)/(R11-R12) \leq 2.00$, which specifies a shape of the sixth lens L6. This condition can facilitate aberration correction of an off-axis angle of view with development of ultra-thin and wide-angle lenses. As an example, the camera optical leans 10 satisfies a condition of $-1.13 \leq (R11+R12)/(R11-R12) \leq 1.60$.

An on-axis thickness of the sixth lens L6 is defined as d11, and the total optical length of the camera optical lens 10 is defined as TTL. The camera optical leans 10 satisfies a condition of $0.04 \leq d11/TTL \leq 0.13$. This condition can achieve ultra-thin lenses. As an example, the camera optical leans 10 satisfies a condition of $0.06 \leq d11/TTL \leq 0.10$.

In this embodiment, an object side surface of the seventh lens L7 is a convex surface at the paraxial position, and an image side surface of the seventh lens L7 is a concave surface at the paraxial position.

The focal length of the camera optical lens 10 is defined as f, and a focal length of the seventh lens L7 is defined as P. The camera optical leans 10 satisfies a condition of $-4.45 \leq f7/f \leq -0.50$. The system therefore achieves a better imaging quality and a lower sensitivity by reasonably distributing the refractive power, within the range of this condition. As an example, the camera optical leans 10 satisfies a condition of $-2.78 \leq f7/f \leq -0.63$.

A central curvature radius of the image side surface of the seventh lens L7 is defined as R13, and a central curvature radius of the image side surface of the seventh lens L7 is defined as R14. The camera optical leans 10 satisfies a condition of $0.64 \leq (R13+R14)/(R13-R14) \leq 3.64$, which specifies a shape of the seventh lens L7. This condition can facilitate aberration correction of an off-axis angle of view with development of ultra-thin and wide-angle lenses. As an example, the camera optical leans 10 satisfies a condition of $1.02 \leq (R13+R14)/(R13-R14) \leq 2.91$.

An on-axis thickness of the seventh lens L7 is defined as d13, and the total optical length of the camera optical lens 10 is defined as TTL. The camera optical leans 10 satisfies a condition of $0.03 \leq d13/TTL \leq 0.15$. This condition can achieve ultra-thin lenses. As an example, the camera optical leans 10 satisfies a condition of $0.05 \leq d13/TTL \leq 0.12$.

In this embodiment, an object side surface of the eighth lens L8 is a convex surface at the paraxial position, and an image side surface thereof is a concave surface at the paraxial position.

The focal length of the camera optical lens 10 is defined as f, and a focal length of the eighth lens L8 is defined as f8. The camera optical leans 10 satisfies a condition of $0.28 \leq f8/f \leq 1.31$. The system therefore achieves a better imaging quality and a lower sensitivity by reasonably distributing the refractive power. As an example, the camera optical leans 10 satisfies a condition of $0.44 \leq f8/f \leq 1.05$.

A central curvature radius of the object side surface of the eighth lens L8 is defined as R15, and a central curvature radius of the image side surface of the eighth lens L8 is defined as R16. The camera optical leans 10 satisfies a condition of $-2.51 \leq (R15+R16)/(R15-R16) \leq -0.75$, which specifies a shape of the eighth lens. This condition can facilitate aberration correction of an off-axis angle of view with development of ultra-thin and wide-angle lenses. As an example, the camera optical leans 10 satisfies a condition of $-1.57 \leq (R15+R16)/(R15-R16) \leq -0.94$.

An on-axis thickness of the eighth lens L8 is defined as d15, and the total optical length of the camera optical lens 10 is defined as TTL. The camera optical leans 10 satisfies a condition of $0.04 \leq d15/TTL \leq 0.12$. This condition can achieve ultra-thin lenses. As an example, the camera optical leans 10 satisfies a condition of $0.06 \leq d15/TTL \leq 0.09$.

In this embodiment, an object side surface of the ninth lens L9 is a concave surface at the paraxial position, and an image side surface of the ninth lens L9 is a concave surface at the paraxial position.

The focal length of the camera optical lens 10 is defined as f, and a focal length of the ninth lens L9 is defined as f9. The camera optical leans 10 satisfies a condition of $-1.51 \leq f9/f \leq -0.48$. The system therefore achieves a better imaging quality and a lower sensitivity by reasonably distributing the refractive power. As an example, the camera optical leans 10 satisfies a condition of $-0.95 \leq f9/f \leq -0.60$.

A central curvature radius of the object side surface of the ninth lens L9 is defined as R17, and a central curvature radius of the image side surface of the ninth lens L9 is defined as R18. The camera optical leans 10 satisfies a condition of $0.27 \leq (R17+R18)/(R17-R18) \leq 0.98$, which specifies a shape of the ninth lens. This condition can facilitate aberration correction of an off-axis angle of view with development of ultra-thin and wide-angle lenses. As an example, the camera optical leans 10 satisfies a condition of $0.43 \leq (R17+R18)/(R17-R18) \leq 0.79$.

An on-axis thickness of the ninth lens L9 is defined as d17, and the total optical length of the camera optical lens 10 is defined as TTL. The camera optical leans 10 satisfies a condition of $0.04 \leq d17/TTL \leq 0.12$. This condition can achieve ultra-thin lenses. As an example, the camera optical leans 10 satisfies a condition of $0.06 \leq d17/TTL \leq 0.10$.

In this embodiment, an image height of the camera optical lens 10 is defined as IH, and the total optical length of the camera optical lens 10 is defined as TTL. The camera optical leans 10 satisfies a condition of $TTL/IH \leq 1.62$, thereby achieving ultra-thin lenses.

In this embodiment, a field of view (FOV) of the camera optical lens 10 is greater than or equal to 78°, thereby achieving a wide angle. The camera optical lens has good imaging performance.

In this embodiment, an F number FNO of the camera optical lens 10 is smaller than or equal to 1.90, thereby achieving a large aperture. The camera optical lens thus has good imaging performance.

When the above conditions are satisfied, the camera optical lens 10 can meet design requirements of a large aperture, a wide angle, and ultra-thinness while having good optical performance. According to the characteristics of the camera optical lens 10, the camera optical lens 10 is particularly applicable to a mobile phone camera lens assembly and a WEB camera lens composed of high pixel CCD, CMOS, and other camera elements.

Examples of the camera optical lens 10 of the present disclosure are described below. Symbols described in each example will be described as follows. The focal length, on-axis distance, central curvature radius, on-axis thickness, inflexion point position, and arrest point position are all in units of mm.

TTL: total optical length (on-axis distance from the object side surface of the first lens L1 to the image plane) in mm.

F number (FNO): a ratio of an effective focal length of the camera optical lens to an entrance pupil diameter of the camera optical lens.

In some embodiments, at least one of the object side surface or the image side surface of each lens is provided with at least one of inflection points or arrest points to meet high-quality imaging requirements. The specific implementations can be referred to the following description.

Table 1 and Table 2 indicate design data of the camera optical lens 10 according to the Embodiment 1 of the present disclosure.

TABLE 1

|  | R | d | nd | vd |
|---|---|---|---|---|
| S1 | ∞ | d0 = −0.446 | | |
| R1 | 2.458 | d1 = 0.423 | nd1 1.5444 | v1 55.82 |
| R2 | 3.689 | d2 = 0.035 | | |
| R3 | 3.394 | d3 = 0.463 | nd2 1.5444 | v2 55.82 |
| R4 | 3.230 | d4 = 0.047 | | |
| R5 | 2.651 | d5 = 0.260 | nd3 1.6700 | v3 19.39 |
| R6 | 3.054 | d6 = 0.384 | | |
| R7 | 10.831 | d7 = 0.200 | nd4 1.6700 | v4 19.39 |
| R8 | 9.756 | d8 = 0.058 | | |
| R9 | 24.660 | d9 = 0.318 | nd5 1.5346 | v5 55.69 |
| R10 | −127.337 | d10 = 0.250 | | |
| R11 | −84.280 | d11 = 0.559 | nd6 1.5346 | v6 55.69 |
| R12 | −12.071 | d12 = 0.324 | | |
| R13 | 9.623 | d13 = 0.672 | nd7 1.5876 | v7 29.04 |
| R14 | 4.010 | d14 = 0.133 | | |
| R15 | 2.473 | d15 = 0.530 | nd8 1.5444 | v8 55.82 |
| R16 | 41.678 | d16 = 0.648 | | |
| R17 | −11.738 | d17 = 0.555 | nd9 1.5346 | v9 55.69 |
| R18 | 2.616 | d18 = 0.250 | | |
| R19 | ∞ | d19 = 0.210 | ndg 1.5168 | vg 64.17 |
| R20 | ∞ | d20 = 0.592 | | |

In the above table, meanings of the symbols will be described as follows.

S1: aperture;

R: curvature radius at center of an optical surface;

R1: central curvature radius of the object side surface of the first lens L1;

R2: central curvature radius of the image side surface of the first lens L1;

R3: central curvature radius of the object side surface of the second lens L2;

R4: central curvature radius of the image side surface of the second lens L2;

R5: central curvature radius of the object side surface of the third lens L3;

R6: central curvature radius of the image side surface of the third lens L3;

R7: central curvature radius of the object side surface of the fourth lens L4;

R8: central curvature radius of the image side surface of the fourth lens L4;

R9: central curvature radius of the object side surface of the fifth lens L5;

R10: central curvature radius of the image side surface of the fifth lens L5;

R11: central curvature radius of the object side surface of the sixth lens L6;

R12: central curvature radius of the image side surface of the sixth lens L6;

R13: central curvature radius of the object side surface of the seventh lens L7;

R14: central curvature radius of the image side surface of the seventh lens L7;

R15: central curvature radius of the object side surface of the eighth lens L8;

R16: central curvature radius of the image side surface of the eighth lens L8;

R17: central curvature radius of the object side surface of the ninth lens L9;

R18: central curvature radius of the image side surface of the ninth lens L9;

R19: central curvature radius of the object side surface of the optical filter GF;

R20: central curvature radius of the image side surface of the optical filter GF;

d: on-axis thickness of a lens and an on-axis distance between the lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from the image side surface of the fifth lens L5 to the object side surface of the sixth lens L6;

d11: on-axis thickness of the sixth lens L6;

d12: on-axis distance from the image side surface of the sixth lens L6 to the object side surface of the seventh lens L7;

d13: on-axis thickness of the seventh lens L7;

d14: on-axis distance from the image side surface of the seventh lens L7 to the object side surface of the eighth lens L8;

d15: on-axis thickness of the eighth lens L8;

d16: on-axis distance from the image side surface of the eighth lens L8 to the object side surface of the ninth lens L9;

d17: on-axis thickness of the ninth lens L9;

d18: on-axis distance from the image side surface of the ninth lens L9 to the object side surface of the optical filter GF;

d19: on-axis thickness of the optical filter GF;

d20: on-axis distance from the image side surface of the optical filter GF to the image plane;

nd: refractive index of d-line;

nd1: refractive index of d-line of the first lens L1;

nd2: refractive index of d-line of the second lens L2;

nd3: refractive index of d-line of the third lens L3;

nd4: refractive index of d-line of the fourth lens L4;

nd5: refractive index of d-line of the fifth lens L5;

nd6: refractive index of d-line of the sixth lens L6;

nd7: refractive index of d-line of the seventh lens L7;

nd8: refractive index of d-line of the eighth lens L8;

nd9: refractive index of d-line of the ninth lens L9;

ndg: refractive index of d-line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;

v8: abbe number of the eighth lens L8;

v9: abbe number of the ninth lens L9; and vg: abbe number of the optical filter GF.

Table 2 indicates aspherical surface data of each lens in the camera optical lens 10 according to the Embodiment 1 of the present disclosure.

TABLE 2

| | Conic coefficient | Aspherical surface coefficient | | | | |
|---|---|---|---|---|---|---|
| | k | A4 | A6 | A8 | A10 | A12 |
| R1 | 4.1258E−02 | −5.1208E−03 | 1.8107E−02 | −4.7171E−02 | 6.8331E−02 | −6.0611E−02 |
| R2 | −1.1858E−01 | −5.1821E−03 | 1.9719E−02 | −8.1790E−03 | 5.3432E−03 | −1.3206E−02 |
| R3 | 1.8578E+00 | −1.9068E−02 | 3.9731E−02 | −3.0582E−02 | 3.1749E−02 | −3.6610E−02 |
| R4 | −5.5919E+01 | −1.2052E−01 | 1.8507E−01 | −4.7744E−02 | −1.1947E−01 | 1.2043E−01 |
| R5 | −2.0816E+01 | −1.4612E−01 | 2.3580E−01 | −8.1651E−02 | −1.3723E−01 | 1.6389E−01 |
| R6 | −8.5857E−02 | −4.2181E−02 | 1.8212E−02 | 1.0739E−01 | −2.0735E−01 | 1.6398E−01 |
| R7 | −3.2487E+01 | 8.9300E−03 | −7.6918E−02 | −6.6289E−02 | 4.3419E−01 | −7.9524E−01 |
| R8 | 2.9444E+01 | 2.0036E−01 | −7.3704E−01 | 1.2916E+00 | −1.4873E+00 | 1.0973E+00 |
| R9 | 2.4811E+02 | 2.5279E−01 | −8.1525E−01 | 1.3743E+00 | −1.5059E+00 | 1.1065E+00 |
| R10 | 5.9127E−02 | −2.0162E−01 | 2.3994E−01 | −1.4572E−01 | 4.8723E−02 | −8.9415E−03 |
| R11 | 9.7648E+01 | 3.7501E−02 | −9.8087E−02 | 9.1112E−02 | −4.0173E−02 | 8.1782E−03 |
| R12 | 3.8723E+01 | −6.0152E−03 | −1.5032E−02 | −1.4600E−02 | 3.2621E−02 | −2.3421E−02 |
| R13 | −2.9904E+01 | −3.3485E−02 | 3.6997E−02 | −4.8304E−02 | 3.4633E−02 | −1.5643E−02 |
| R14 | −9.4652E+00 | −1.2931E−01 | 1.0622E−01 | −6.1391E−02 | 2.3399E−02 | −5.9201E−03 |
| R15 | −8.7133E+00 | −2.3355E−02 | −1.2277E−02 | 1.4020E−02 | −8.3121E−03 | 2.7904E−03 |
| R16 | 9.6974E+01 | 7.1988E−02 | −7.6452E−02 | 3.9573E−02 | −1.3492E−02 | 2.9828E−03 |
| R17 | 3.2548E+00 | −6.9201E−02 | 1.5811E−02 | −4.0336E−03 | 1.5481E−03 | −3.5136E−04 |
| R18 | −9.9213E+00 | −4.5988E−02 | 1.3880E−02 | −3.4171E−03 | 6.4255E−04 | −8.4731E−05 |

| | Conic coefficient | Aspherical surface coefficient | | | |
|---|---|---|---|---|---|
| | k | A14 | A16 | A18 | A20 |
| R1 | 4.1258E−02 | 3.3636E−02 | −1.1434E−02 | 2.1838E−03 | −1.8039E−04 |
| R2 | −1.1858E−01 | 8.6683E−03 | −1.7016E−03 | 0.0000E+00 | 0.0000E+00 |
| R3 | 1.8578E+00 | 1.8908E−02 | −3.3625E−03 | 0.0000E+00 | 0.0000E+00 |
| R4 | −5.5919E+01 | −4.3405E−02 | 5.5262E−03 | 0.0000E+00 | 0.0000E+00 |
| R5 | −2.0816E+01 | −6.6889E−02 | 9.6743E−03 | 0.0000E+00 | 0.0000E+00 |
| R6 | −8.5857E−02 | −5.9898E−02 | 8.2209E−03 | 0.0000E+00 | 0.0000E+00 |
| R7 | −3.2487E+01 | 7.5870E−01 | −4.0608E−01 | 1.1638E−01 | −1.4010E−02 |
| R8 | 2.9444E+01 | −5.0154E−01 | 1.3397E−01 | −1.8238E−02 | 8.6265E−04 |
| R9 | 2.4811E+02 | −5.3311E−01 | 1.5937E−01 | −2.6492E−02 | 1.8489E−03 |
| R10 | 5.9127E−02 | 7.5216E−04 | 0.0000E+00 | 0.0000E+00 | 0.0000E+00 |
| R11 | 9.7648E+01 | −4.9100E−04 | −2.9802E−05 | 0.0000E+00 | 0.0000E+00 |
| R12 | 3.8723E+01 | 9.3133E−03 | −2.2568E−03 | 3.1941E−04 | −2.0045E−05 |
| R13 | −2.9904E+01 | 4.5653E−03 | −8.6268E−04 | 9.5913E−05 | −4.6126E−06 |
| R14 | −9.4652E+00 | 9.6815E−04 | −9.8259E−05 | 5.8059E−06 | −1.6402E−07 |
| R15 | −8.7133E+00 | −5.9647E−04 | 8.0978E−05 | −6.1460E−06 | 1.9080E−07 |
| R16 | 9.6974E+01 | −4.1399E−04 | 3.4668E−05 | −1.6004E−06 | 3.1309E−08 |
| R17 | 3.2548E+00 | 4.3686E−05 | −3.0452E−06 | 1.1253E−07 | −1.7217E−09 |
| R18 | −9.9213E+00 | 7.3108E−06 | −3.8805E−07 | 1.1485E−08 | −1.4583E−10 |

In Table 2, k is a conic coefficient, and A4, A6, A8, A10, A12, A14, A16, A18, and A20 are aspherical surface coefficients.

$$y = (x^2/R)/\{1+[1-(k+x^2/R^2)]\} + A4x^4 + A6x^6 + A8x^8 + A10x^{10} + A12x^{12} + A14x^{14} + A16x^{16} + A18x^{18} + A20x^{20} \quad (1),$$

where x is a vertical distance between a point on an aspherical curve and the optic axis, and y is an aspherical depth (a vertical distance between a point on an aspherical surface at a distance of x from the optic axis and a surface tangent to a vertex of the aspherical surface on the optic axis).

In the present embodiment, an aspherical surface of each lens surface uses the aspherical surface represented by the above formula (1). However, the present disclosure is not limited to the aspherical polynomial form represented by the formula (1).

Table 3 and Table 4 indicate design data of inflection points and arrest points of each lens in the camera optical lens 10 according to the Embodiment 1 of the present disclosure. P1R1 and P1R2 represent the object side surface and the image side surface of the first lens L1, respectively. P2R1 and P2R2 represent the object side surface and the image side surface of the second lens L2, respectively. P3R1 and P3R2 represent the object side surface and the image side surface of the third lens L3, respectively. P4R1 and P4R2 represent the object side surface and the image side surface of the fourth lens L4, respectively. P5R1 and P5R2 represent the object side surface and the image side surface of the fifth lens L5, respectively. P6R1 and P6R2 represent the object side surface and the image side surface of the sixth lens L6, respectively. P7R1 and P7R2 represent the object side surface and the image side surface of the seventh lens L7, respectively. P8R1 and P8R2 represent the object side surface and the image side surface of the eighth lens L8, respectively. P9R1 and P9R2 represent the object side surface and the image side surface of the ninth lens L9, respectively. Data in the "inflection point position" column refers to vertical distances from inflection points arranged on each lens surface to the optic axis of the camera optical lens 10. Data in the "arrest point position" column refers to vertical distances from arrest points arranged on each lens surface to the optic axis of the camera optical lens 10.

TABLE 3

| | Number of inflection points | Inflection point position 1 | Inflection point position 2 | Inflection point position 3 | Inflection point position 4 | Inflection point position 5 |
|---|---|---|---|---|---|---|
| P1R1 | 0 | / | / | / | / | / |
| P1R2 | 1 | 1.385 | / | / | / | / |

TABLE 3-continued

| | Number of inflection points | Inflection point position 1 | Inflection point position 2 | Inflection point position 3 | Inflection point position 4 | Inflection point position 5 |
|---|---|---|---|---|---|---|
| P2R1 | 1 | 1.395 | / | / | / | / |
| P2R2 | 1 | 1.325 | / | / | / | / |
| P3R1 | 0 | / | / | / | / | / |
| P3R2 | 0 | / | / | / | / | / |
| P4R1 | 1 | 0.485 | / | / | / | / |
| P4R2 | 2 | 0.565 | 1.305 | / | / | / |
| P5R1 | 2 | 0.585 | 1.035 | / | / | / |
| P5R2 | 2 | 0.425 | 1.475 | / | / | / |
| P6R1 | 5 | 0.185 | 0.425 | 1.085 | 1.295 | 1.425 |
| P6R2 | 1 | 1.615 | / | / | / | / |
| P7R1 | 2 | 0.615 | 1.975 | / | / | / |
| P7R2 | 1 | 0.465 | / | / | / | / |
| P8R1 | 3 | 0.745 | 2.225 | 2.365 | / | / |
| P8R2 | 2 | 0.895 | 2.165 | / | / | / |
| P9R1 | 2 | 1.735 | 3.135 | / | / | / |
| P9R2 | 1 | 0.695 | / | / | / | / |

TABLE 4

| | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 1 | 0.755 | / |
| P4R2 | 1 | 0.895 | / |
| P5R1 | 0 | / | / |
| P5R2 | 1 | 0.575 | / |
| P6R1 | 1 | 1.595 | / |
| P6R2 | 0 | / | / |
| P7R1 | 1 | 1.015 | / |
| P7R2 | 1 | 1.025 | / |
| P8R1 | 1 | 1.375 | / |
| P8R2 | 1 | 1.335 | / |
| P9R1 | 2 | 2.875 | 3.335 |
| P9R2 | 1 | 1.535 | / |

Figure 2:
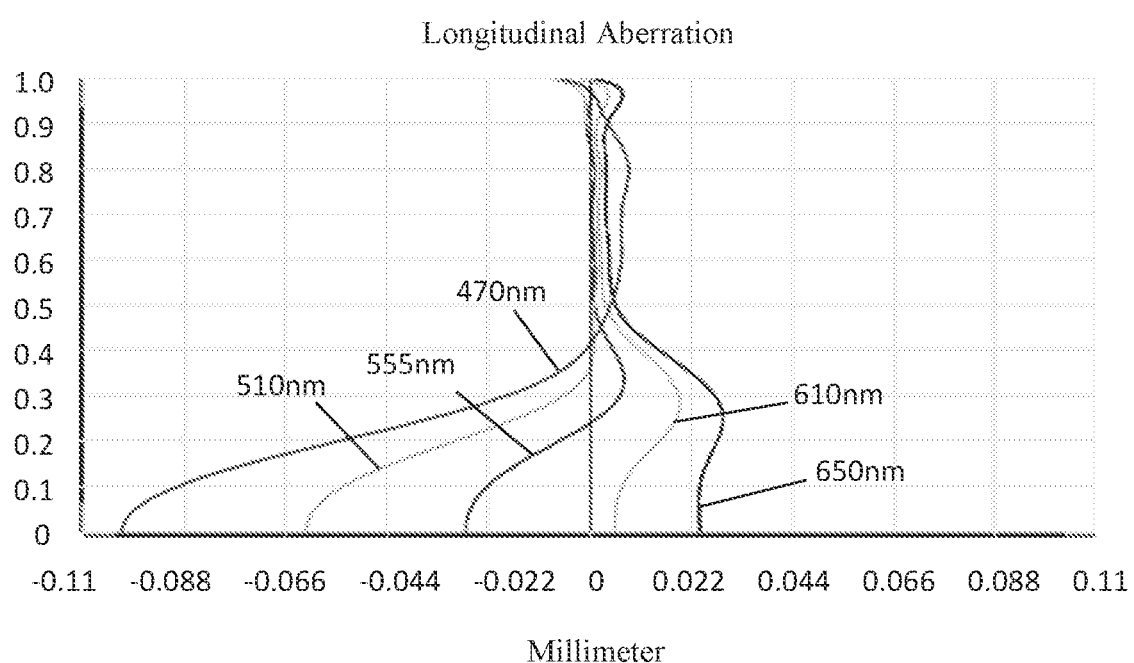
FIG. 2 is a schematic diagram of longitudinal aberration of the camera optical lens shown in FIG. 1.
Figure 3:
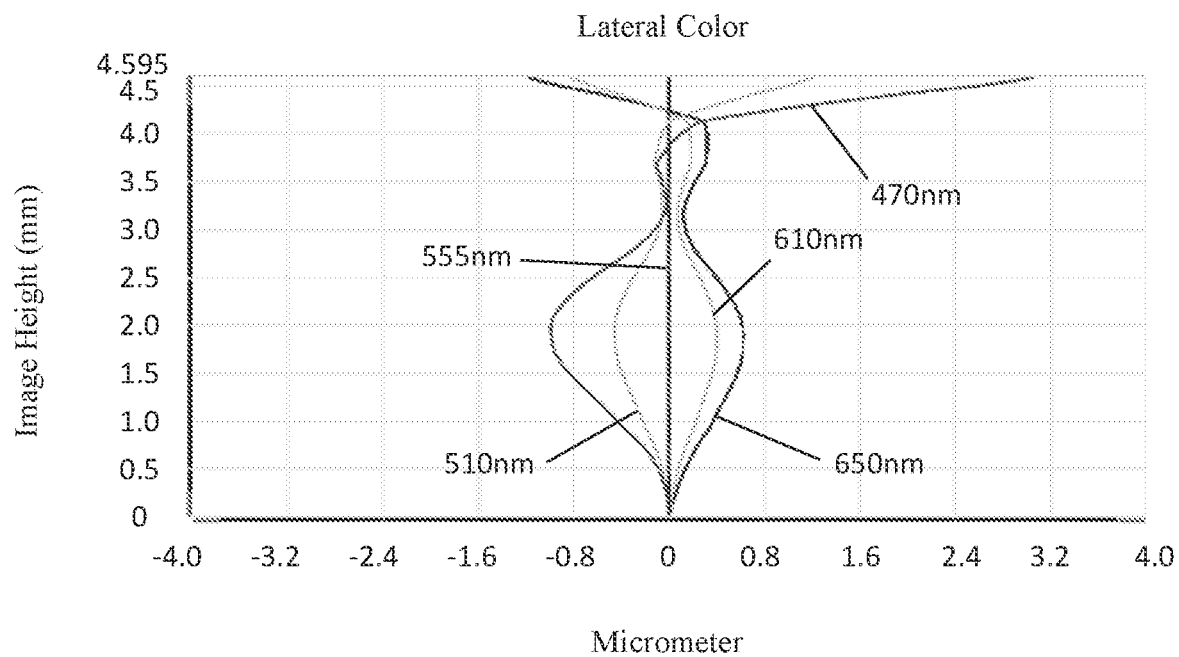
FIG. 3 is a schematic diagram of lateral color of the camera optical lens shown in FIG. 1.
Figure 4:
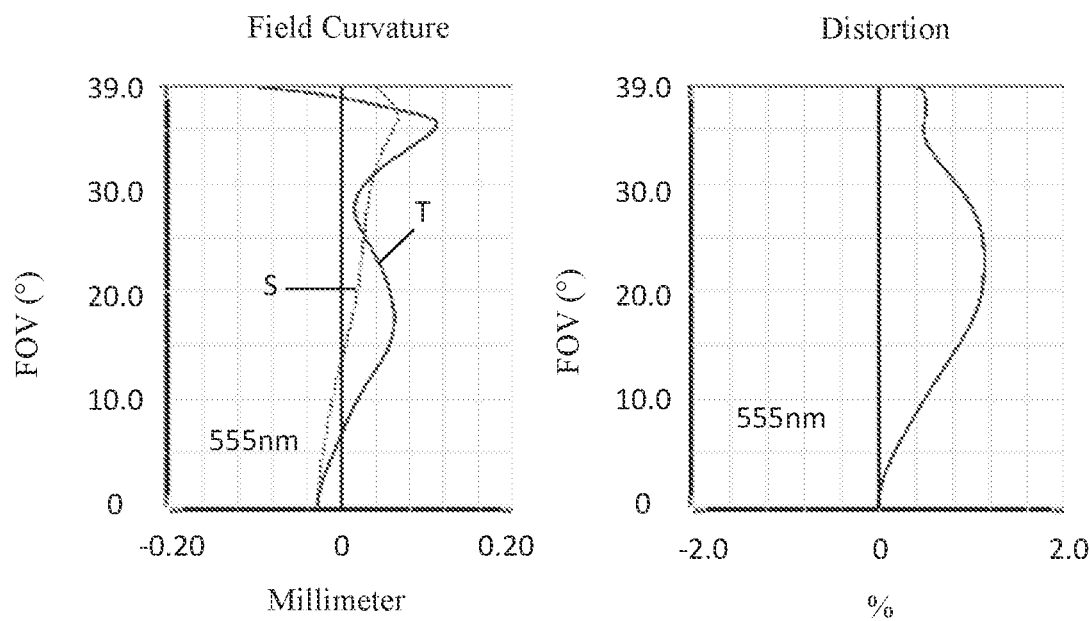
FIG. 4 is a schematic diagram of field curvature and distortion of the camera optical lens shown in FIG. 1.

FIG. 2 and FIG. 3 respectively illustrate schematic diagrams of longitudinal aberration and lateral color of light with wavelengths of 650 nm, 610 nm, 555 nm, 510 nm, and 470 nm after passing through the camera optical lens 10 in the Embodiment 1. FIG. 4 illustrates a schematic diagram of field curvature and distortion of light with a wavelength of 555 nm after passing through the camera optical lens 10 in the Embodiment 1, in which the field curvature S is a field curvature in a sagittal direction, and T is a field curvature in a meridional direction.

Table 13 hereinafter indicates various values in Embodiments 1, 2, and 3 corresponding to parameters specified in the above conditions.

As shown in Table 13, the Embodiment 1 satisfies each of the above conditions.

In the present embodiment, the camera optical lens 10 has an entrance pupil diameter ENPD of 2.877 mm, an image height IH of full field of 4.595 mm, and the FOV (field of view) of 78.00° in a diagonal direction, such that the camera optical lens 10 meets design requirements for large aperture, wide angle and ultra-thinness while sufficiently correcting on-axis and off-axis chromatic aberration, thereby achieving excellent optical characteristics.

Embodiment 2

The Embodiment 2 is substantially the same as the Embodiment 1. The meanings of symbols in the Embodiment 2 are the same as those in the Embodiment 1. Differences therebetween will be described below.

Figure 5:
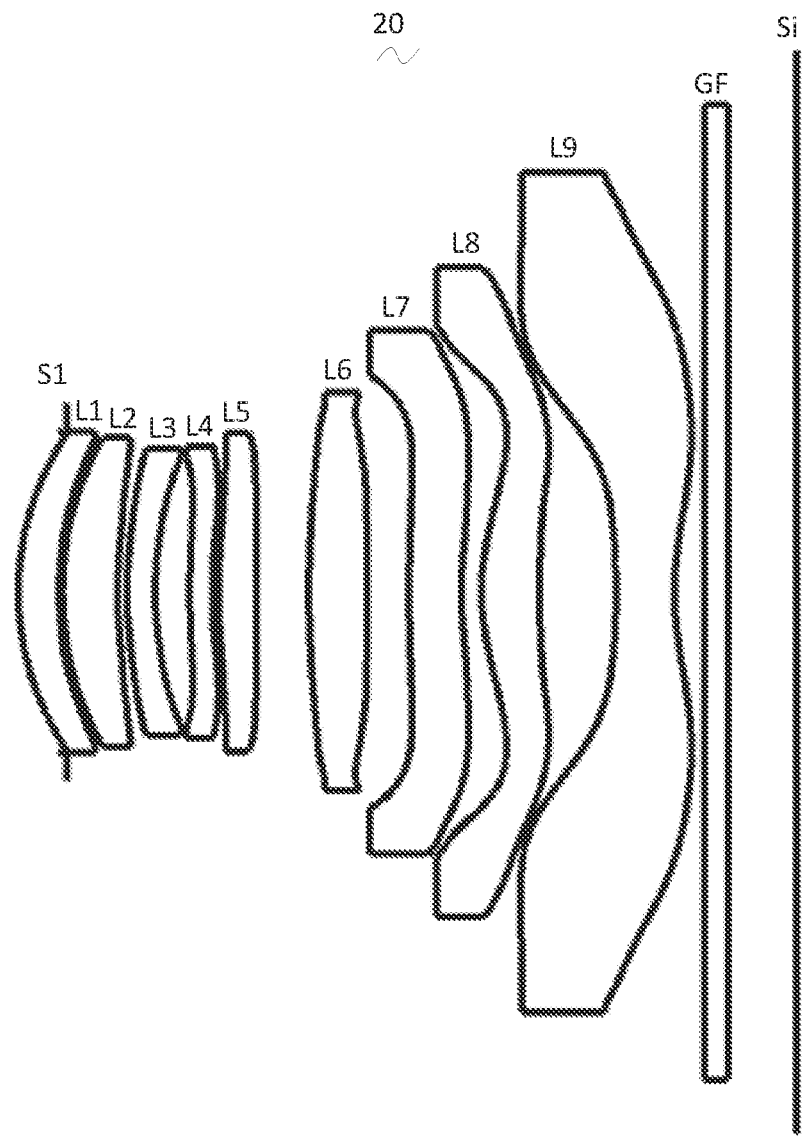
FIG. 5 is a schematic structural diagram of a camera optical lens according to Embodiment 2 of the present disclosure.

FIG. 5 illustrates a camera optical lens 20 according to the Embodiment 2 of the present disclosure. In this embodiment, the fourth lens L4 has positive refractive power.

In this embodiment, the image side surface of the fifth lens L5 is a concave surface at the paraxial position, and the object side surface of the sixth lens L6 is a convex surface at the paraxial position.

Table 5 and Table 6 indicate design data of the camera optical lens 20 according to the Embodiment 2 of the present disclosure.

TABLE 5

| | R | d | nd | vd |
|---|---|---|---|---|
| S1 | ∞ | d0 = -0.4.35 | | |
| R1 | 2.648 | d1 = 0.364 | nd1 1.5444 | v1 55.82 |
| R2 | 3.340 | d2 = 0.035 | | |
| R3 | 3.117 | d3 = 0.492 | nd2 1.5444 | v2 55.82 |
| R4 | 2.784 | d4 = 0.082 | | |
| R5 | 2.415 | d5 = 0.260 | nd3 1.6700 | v3 19.39 |
| R6 | 3.160 | d6 = 0.310 | | |
| R7 | 8.050 | d7 = 0.204 | nd4 1.6700 | v4 19.39 |
| R8 | 9.002 | d8 = 0.059 | | |
| R9 | 21.340 | d9 = 0.336 | nd5 1.5346 | v5 55.69 |
| R10 | 29.478 | d10 = 0.472 | | |
| R11 | 9.710 | d11 = 0.524 | nd6 1.5346 | v6 55.69 |
| R12 | -198.477 | d12 = 0.376 | | |
| R13 | 9.253 | d13 = 0.473 | nd7 1.5876 | v7 29.04 |
| R14 | 3.002 | d14 = 0.179 | | |
| R15 | 1.992 | d15 = 0.524 | nd8 1.5444 | v8 55.82 |
| R16 | 20.628 | d16 = 0.684 | | |
| R17 | -9.617 | d17 = 0.528 | nd9 1.5346 | v9 55.69 |
| R18 | 2.845 | d18 = 0.273 | | |
| R19 | ∞ | d19 = 0.210 | ndg 1.5168 | vg 64.17 |
| R20 | ∞ | d20 = 0.615 | | |

Table 6 indicates aspherical surface data of each lens in the camera optical lens 20 according to the Embodiment 2 of the present disclosure.

TABLE 6

| | Conic coefficient | Aspherical surface coefficient | | | | |
|---|---|---|---|---|---|---|
| | k | A4 | A6 | A8 | A10 | A12 |
| R1 | 1.1239E-01 | -4.3762E-03 | 1.8328E-02 | -4.7188E-02 | 6.8226E-02 | -6.0611E-02 |
| R2 | 7.9578E-02 | -5.6906E-02 | 2.7405E-01 | -4.8286E-01 | 4.6871E-01 | -2.6355E-01 |
| R3 | 1.7033E+00 | -6.5532E-02 | 2.4479E-01 | -4.0709E-01 | 3.8645E-01 | -2.1791E-01 |
| R4 | -5.5892E+01 | -1.2668E-01 | 2.4501E-01 | -1.7920E-01 | 8.6852E-03 | 6.2676E-02 |
| R5 | -2.4285E+01 | -1.9035E-01 | 3.8243E-01 | -3.0345E-01 | 3.8919E-02 | 9.6376E-02 |
| R6 | -8.6949E-01 | -5.9590E-02 | -3.2850E-02 | 3.9575E-01 | -6.9363E-01 | 5.5746E-01 |
| R7 | -1.9110E+01 | -7.6430E-02 | 6.1173E-01 | -2.5787E+00 | 5.8242E+00 | -7.9780E+00 |

TABLE 6-continued

| | | | | | | |
|---|---|---|---|---|---|---|
| R8 | 3.1597E+01 | 2.3834E−01 | −6.1172E−01 | 5.0164E−01 | 3.3180E−01 | −1.3516E+00 |
| R9 | 2.1364E+02 | 2.9821E−01 | −7.7298E−01 | 9.5839E−01 | −5.6374E−01 | −1.4233E−01 |
| R10 | −8.2801E+04 | 4.3510E−02 | −1.2633E−01 | 1.2812E−01 | −7.5729E−02 | 3.2936E−02 |
| R11 | 0.0000E+00 | 1.2342E−02 | −2.2356E−02 | 2.1289E−04 | 9.8251E−03 | −5.0522E−03 |
| R12 | −1.8692E+03 | −6.3287E−03 | 1.5792E−02 | −4.6443E−02 | 4.1592E−02 | −2.2671E−02 |
| R13 | −8.7749E+00 | −6.3086E−02 | 6.9747E−02 | −2.0548E−02 | −2.5729E−02 | 2.4511E−02 |
| R14 | −1.0233E+01 | −1.9845E−01 | 2.0767E−01 | −1.1689E−01 | 3.4789E−02 | −4.5974E−03 |
| R15 | −7.7347E+00 | −3.3843E−02 | 3.0266E−02 | −2.8147E−02 | 1.3165E−02 | −3.9281E−03 |
| R16 | −9.9000E+01 | 8.5643E−02 | −6.3340E−02 | 1.2483E−02 | 2.0800E−03 | −1.6872E−03 |
| R17 | 7.2241E−01 | −3.4203E−02 | −9.0440E−03 | −8.2705E−04 | 3.1435E−03 | −1.0164E−03 |
| R18 | −3.8293E+00 | −4.7172E−02 | 5.5886E−04 | 3.4755E−03 | −1.0440E−03 | 1.5604E−04 |

| | Conic coefficient | Aspherical surface coefficient | | | |
|---|---|---|---|---|---|
| | k | A14 | A16 | A18 | A20 |
| R1 | 1.1239E−01 | 3.3636E−02 | −1.1434E−02 | 2.1838E−03 | −1.8039E−04 |
| R2 | 7.9578E−02 | 7.9061E−02 | −9.6952E−03 | 0.0000E+00 | 0.0000E+00 |
| R3 | 1.7033E+00 | 6.5760E−02 | −8.0134E−03 | 0.0000E+00 | 0.0000E+00 |
| R4 | −5.5892E+01 | −3.4766E−02 | 6.1153E−03 | 0.0000E+00 | 0.0000E+00 |
| R5 | −2.4285E+01 | −5.9493E−02 | 1.0817E−02 | 0.0000E+00 | 0.0000E+00 |
| R6 | −8.6949E−01 | −2.1500E−01 | 3.1933E−02 | 0.0000E+00 | 0.0000E+00 |
| R7 | −1.9110E+01 | 6.7284E+00 | −3.4049E+00 | 9.4842E−01 | −1.1194E−01 |
| R8 | 3.1597E+01 | 1.5313E+00 | −8.7478E−01 | 2.5377E−01 | −2.9627E−02 |
| R9 | 2.1364E+02 | 5.1009E−01 | −3.6596E−01 | 1.1707E−01 | −1.4405E−02 |
| R10 | −8.2801E+04 | −1.0485E−02 | 1.5269E−03 | 0.0000E+00 | 0.0000E+00 |
| R11 | 0.0000E+00 | 1.0450E−03 | −7.8852E−05 | 0.0000E+00 | 0.0000E+00 |
| R12 | −1.8692E+03 | 9.1196E−03 | −2.5602E−03 | 4.2482E−04 | −3.0241E−05 |
| R13 | −8.7749E+00 | −9.1828E−03 | 1.7334E−03 | −1.5590E−04 | 4.6941E−06 |
| R14 | −1.0233E+01 | −1.7507E−04 | 1.3361E−04 | −1.4927E−05 | 5.2717E−07 |
| R15 | −7.7347E+00 | 7.8406E−04 | −1.1035E−04 | 1.0654E−05 | −5.0512E−07 |
| R16 | −9.9000E+01 | 4.0973E−04 | −5.1392E−05 | 3.3286E−06 | −8.7925E−08 |
| R17 | 7.2241E−01 | 1.5378E−04 | −1.2680E−05 | 5.5281E−07 | −1.0020E−08 |
| R18 | −3.8293E+00 | −1.4031E−05 | 7.8294E−07 | −2.5252E−08 | 3.6007E−10 |

Table 7 and Table 8 indicate design data of inflection points and arrest points of each lens in the camera optical lens 20 according to the Embodiment 2 of the present disclosure.

TABLE 7

| | Number of inflection points | Inflection point position 1 | Inflection point position 2 | Inflection point position 3 | Inflection point position 4 |
|---|---|---|---|---|---|
| P1R1 | 0 | / | / | / | / |
| P1R2 | 0 | / | / | / | / |
| P2R1 | 0 | / | / | / | / |
| P2R2 | 2 | 1.025 | 1.085 | / | / |
| P3R1 | 0 | / | / | / | / |
| P3R2 | 1 | 1.215 | / | / | / |
| P4R1 | 1 | 0.565 | / | / | / |
| P4R2 | 2 | 0.595 | 1.285 | / | / |
| P5R1 | 4 | 0.625 | 0.995 | 1.165 | 1.355 |
| P5R2 | 1 | 0.455 | / | / | / |
| P6R1 | 2 | 0.855 | 1.075 | / | / |
| P6R2 | 1 | 1.405 | / | / | / |
| P7R1 | 1 | 0.895 | / | / | / |
| P7R2 | 3 | 0.425 | 2.095 | 2.265 | / |
| P8R1 | 3 | 0.825 | 2.115 | 2.365 | / |
| P8R2 | 3 | 0.915 | 2.135 | 2.485 | / |
| P9R1 | 3 | 1.715 | 2.965 | 2.995 | / |
| P9R2 | 4 | 0.735 | 3.045 | 3.465 | 3.725 |

TABLE 8

| | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 1 | 0.845 | / |
| P4R2 | 1 | 0.925 | / |
| P5R1 | 2 | 1.305 | 1.385 |
| P5R2 | 1 | 0.655 | / |
| P6R1 | 0 | / | / |
| P6R2 | 1 | 1.675 | / |
| P7R1 | 1 | 1.175 | / |
| P7R2 | 1 | 1.275 | / |
| P8R1 | 1 | 1.435 | / |
| P8R2 | 1 | 1.335 | / |
| P9R1 | 1 | 2.795 | / |
| P9R2 | 2 | 1.455 | 3.875 |

Figure 6:
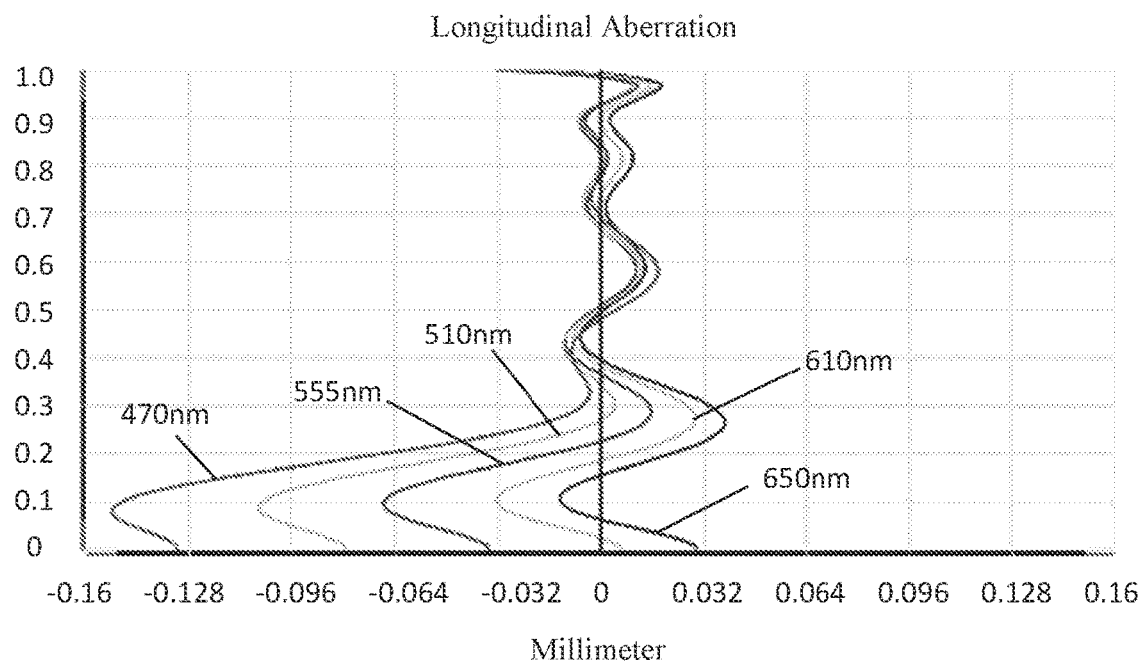
FIG. 6 is a schematic diagram of longitudinal aberration of the camera optical lens shown in FIG. 5.
Figure 7:
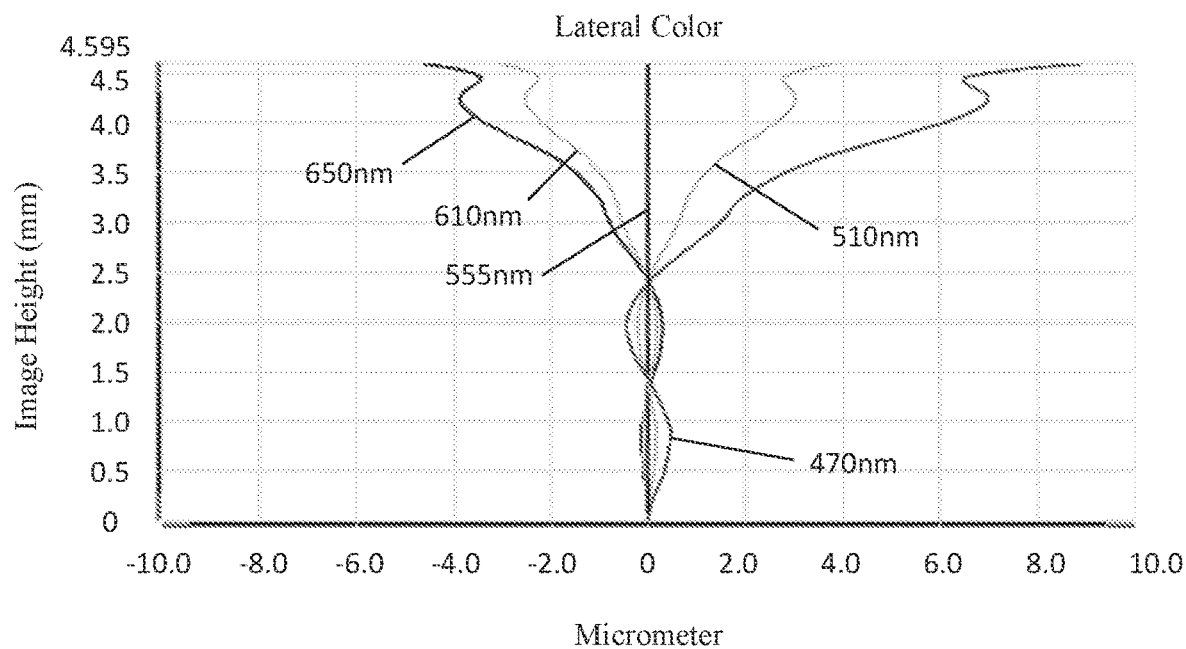
FIG. 7 is a schematic diagram of lateral color of the camera optical lens shown in FIG. 5.
Figure 8:
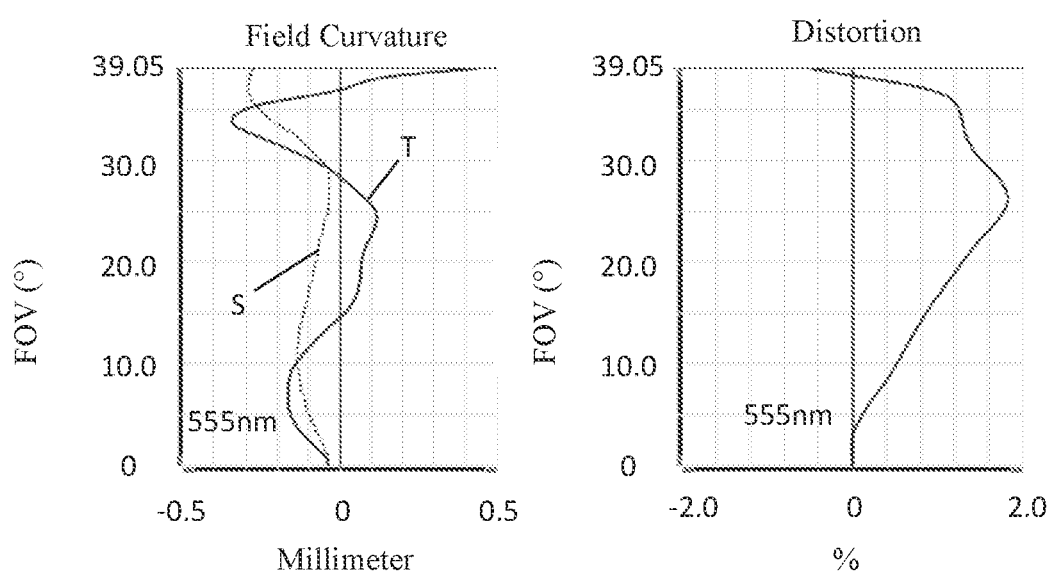
FIG. 8 is a schematic diagram of field curvature and distortion of the camera optical lens shown in FIG. 5.

FIG. 6 and FIG. 7 respectively illustrate schematic diagrams of a longitudinal aberration and a lateral color of light with wavelengths of 650 nm, 610 nm, 555 nm, 510 nm, and 470 nm after passing through the camera optical lens 20 in the Embodiment 2. FIG. 8 illustrates a schematic diagram of field curvature and distortion of light with a wavelength of 555 nm after passing through the camera optical lens 20 in the Embodiment 2.

As shown in Table 13, the Embodiment 2 satisfies the above conditions.

In this embodiment, the camera optical lens 20 has an entrance pupil diameter ENPD of 2.967 mm, an image height IH of full field of 4.595 mm, and the FOV (field of view) of 78.10° in a diagonal direction, such that the camera optical lens 20 meets design requirements for large aperture, wide angle and ultra-thinness while sufficiently correcting on-axis and off-axis chromatic aberration, thereby achieving excellent optical characteristics.

Embodiment 3

The Embodiment 3 is substantially the same as the Embodiment 1. The meanings of symbols in the Embodiment 3 are the same as those in the Embodiment 1. Differences therebetween will be described below.

Figure 9:
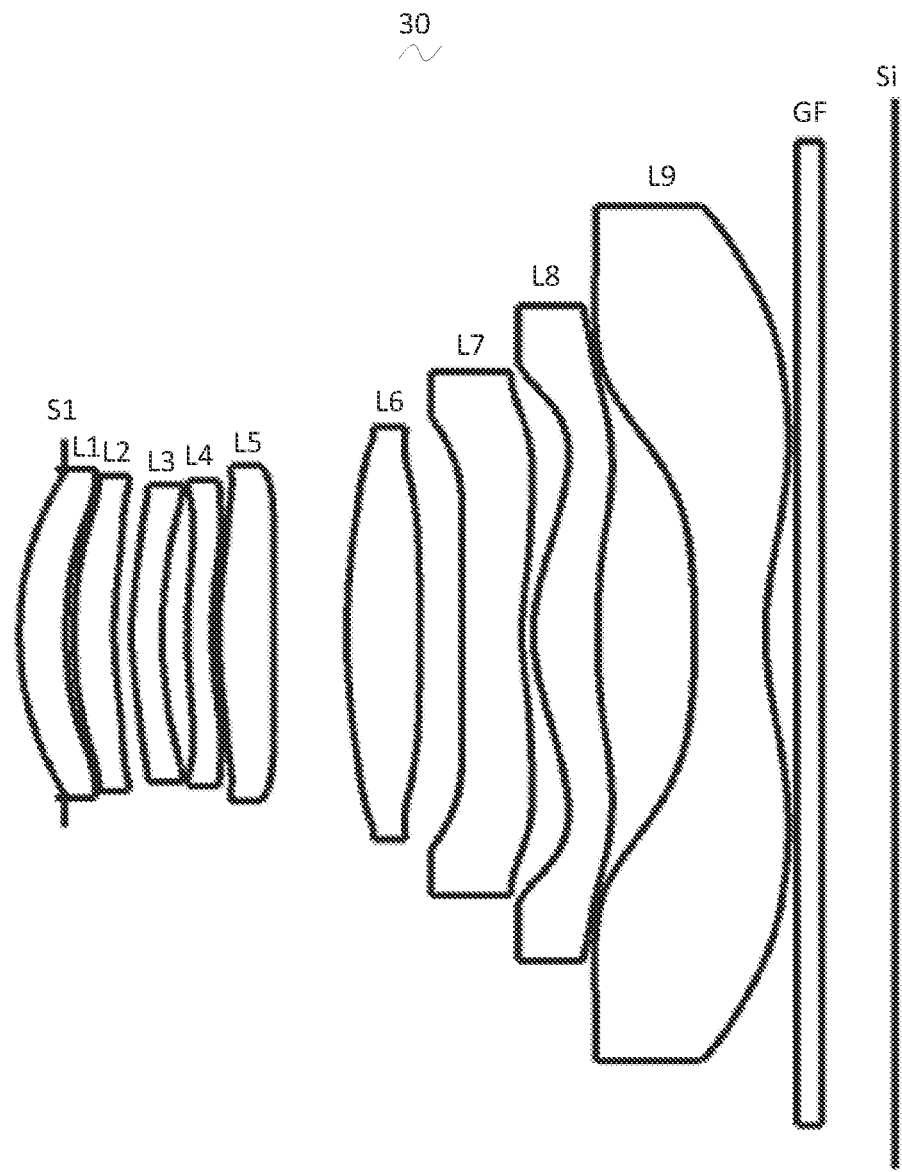
FIG. 9 is a schematic structural diagram of a camera optical lens according to Embodiment 3 of the present disclosure.

FIG. 9 illustrates a camera optical lens 30 according to the Embodiment 3 of the present disclosure. In this embodiment, the fourth lens L4 has a positive refractive power, and the fifth lens L5 has a negative refractive power.

In this embodiment, the image side surface of the fifth lens L5 is a concave surface at the paraxial position, and the object side surface of the sixth lens L6 is a convex surface at the paraxial position.

Table 9 and Table 10 indicate design data of the camera optical lens 30 according to the Embodiment 3 of the present disclosure.

TABLE 9

|  | R | d | nd | vd |
|---|---|---|---|---|
| S1 | ∞ | d0 = −0.386 | | |
| R1 | 2.976 | d1 = 0.393 | nd1 1.5444 | v1 55.82 |

TABLE 9-continued

|  | R | d | nd | vd |
|---|---|---|---|---|
| R2 | 3.552 | d2 = 0.070 | | |
| R3 | 3.560 | d3 = 0.338 | nd2 1.5444 | v2 55.82 |
| R4 | 2.595 | d4 = 0.150 | | |
| R5 | 2.379 | d5 = 0.260 | nd3 1.6700 | v3 19.39 |
| R6 | 3.495 | d6 = 0.217 | | |
| R7 | 6.264 | d7 = 0.205 | nd4 1.6700 | v4 19.39 |
| R8 | 8.222 | d8 = 0.059 | | |
| R9 | 18.431 | d9 = 0.462 | nd5 1.5346 | v5 55.69 |
| R10 | 15.871 | d10 = 0.624 | | |
| R11 | 7.079 | d11 = 0.622 | nd6 1.5346 | v6 55.69 |
| R12 | −16.827 | d12 = 0.347 | | |
| R13 | 18.147 | d13 = 0.513 | nd7 1.5876 | v7 29.04 |
| R14 | 2.166 | d14 = 0.097 | | |
| R15 | 1.525 | d15 = 0.551 | nd8 1.5444 | v8 55.82 |
| R16 | 13.453 | d16 = 0.817 | | |
| R17 | −13.379 | d17 = 0.603 | nd9 1.5346 | v9 55.69 |
| R18 | 2.774 | d18 = 0.272 | | |
| R19 | ∞ | d19 = 0.210 | ndg 1.5168 | vg 64.17 |
| R20 | ∞ | d20 = 0.614 | | |

Table 10 indicates aspherical surface data of each lens in the camera optical lens 30 according to the Embodiment 3 of the present disclosure.

TABLE 10

| | Conic coefficient | Aspherical surface coefficient | | | | |
|---|---|---|---|---|---|---|
| | k | A4 | A6 | A8 | A10 | A12 |
| R1 | 4.1213E−01 | −3.1641E−03 | −1.1386E−02 | 1.1173E−01 | −2.6785E−01 | 3.2485E−01 |
| R2 | −4.1869E−01 | −1.2714E−01 | 5.9585E−01 | −1.0392E+00 | 9.8474E−01 | −5.3295E−01 |
| R3 | 5.7074E−01 | −1.8195E−01 | 6.7671E−01 | −1.1275E+00 | 1.0360E+00 | −5.5001E−01 |
| R4 | −6.7219E+01 | −4.5907E−02 | 1.3904E−01 | −2.3679E−01 | 2.0866E−01 | −1.0191E−01 |
| R5 | −2.9866E+01 | −1.5182E−01 | 3.5036E−01 | −3.9811E−01 | 2.3208E−01 | −5.4460E−02 |
| R6 | −3.7313E+00 | −1.6523E−01 | 2.8833E−01 | −8.4677E−02 | −2.4426E−01 | 2.9634E−01 |
| R7 | −1.0320E+01 | −6.4342E−02 | 5.7119E−01 | −2.5353E+00 | 5.7075E+00 | −7.5014E+00 |
| R8 | 3.2797E+01 | 4.1658E−01 | −9.2123E−01 | 1.2909E−01 | 2.2373E+00 | −4.1355E+00 |
| R9 | 1.6053E+02 | 4.1965E−01 | −8.1074E−01 | 1.8330E−01 | 1.4521E+00 | −2.5659E+00 |
| R10 | −1.0727E+04 | 6.0871E−02 | −1.4826E−01 | 1.3305E−01 | −6.1185E−02 | 1.2129E−02 |
| R11 | 1.7917E+00 | 1.2963E−02 | −1.9968E−02 | 9.6248E−03 | −4.7515E−03 | 2.4856E−03 |
| R12 | −6.4597E+02 | −1.3955E−02 | 1.4410E−02 | −4.2375E−03 | −2.2807E−02 | 2.6397E−02 |
| R13 | 7.0855E+01 | −6.7994E−02 | 8.3630E−02 | −3.5717E−02 | −1.5893E−02 | 2.1700E−02 |
| R14 | −1.1467E+01 | −2.3393E−01 | 2.5676E−01 | −1.5417E−01 | 5.6181E−02 | −1.3087E−02 |
| R15 | −6.7696E+00 | −5.2384E−02 | 4.5321E−02 | −3.0203E−02 | 1.0677E−02 | −1.7510E−03 |
| R16 | −1.0217E+01 | 9.8069E−02 | −8.8174E−02 | 3.5033E−02 | −8.3504E−03 | 1.1962E−03 |
| R17 | 4.8327E+00 | −4.4990E−02 | 4.3942E−03 | −1.9507E−03 | 8.9866E−04 | −1.1019E−04 |
| R18 | −5.8485E+00 | −3.8192E−02 | 7.3110E−03 | −1.0221E−03 | 1.2088E−04 | −9.2547E−06 |

| | Conic coefficient | Aspherical surface coefficient | | | |
|---|---|---|---|---|---|
| | k | A14 | A16 | A18 | A20 |
| R1 | 4.1213E−01 | −2.2737E−01 | 9.3058E−02 | −2.0723E−02 | 1.9397E−03 |
| R2 | −4.1869E−01 | 1.5190E−01 | −1.7627E−02 | 0.0000E+00 | 0.0000E+00 |
| R3 | 5.7074E−01 | 1.5643E−01 | −1.8379E−02 | 0.0000E+00 | 0.0000E+00 |
| R4 | −6.7219E+01 | 2.8825E−02 | −3.8269E−03 | 0.0000E+00 | 0.0000E+00 |
| R5 | −2.9866E+01 | −4.1916E−01 | 2.8384E−03 | 0.0000E+00 | 0.0000E+00 |
| R6 | −3.7313E+00 | −1.3565E−01 | 2.2982E−02 | 0.0000E+00 | 0.0000E+00 |
| R7 | −1.0320E+01 | 5.9558E+00 | −2.8162E+00 | 7.3122E−01 | −8.0333E−02 |
| R8 | 3.2797E+01 | 3.6615E+00 | −1.8026E+00 | 4.7428E−01 | −5.2235E−02 |
| R9 | 1.6053E+02 | 2.1500E+00 | −1.0077E+00 | 2.5358E−01 | −2.6769E−02 |
| R10 | −1.0727E+04 | 5.8583E−05 | −3.1431E−04 | 0.0000E+00 | 0.0000E+00 |
| R11 | 1.7917E+00 | −6.5539E−04 | 6.2801E−05 | 0.0000E+00 | 0.0000E+00 |
| R12 | −6.4597E+02 | −1.3751E−02 | 4.0540E−03 | −6.5350E−04 | 4.4476E−05 |
| R13 | 7.0855E+01 | −9.9771E−03 | 2.5017E−03 | −3.4038E−04 | 1.9601E−05 |
| R14 | −1.1467E+01 | 1.9015E−03 | −1.5600E−04 | 5.6585E−06 | −2.4961E−08 |
| R15 | −6.7696E+00 | −3.1934E−05 | 5.2552E−05 | −6.4214E−06 | 2.3741E−07 |
| R16 | −1.0217E+01 | −8.8965E−05 | 1.3146E−06 | 2.3046E−07 | −1.0605E−08 |
| R17 | 4.8327E+00 | −3.7748E−06 | 1.7810E−06 | −1.3412E−07 | 3.3267E−09 |
| R18 | −5.8485E+00 | −6.6852E−08 | 7.4896E−08 | −5.1183E−09 | 1.1042E−10 |

Table 11 and Table 12 indicate design data of inflection points and arrest points of each lens in the camera optical lens 30 according to the Embodiment 3 of the present disclosure.

TABLE 11

| | Number of inflection points | Inflection point position 1 | Inflection point position 2 | Inflection point position 3 | Inflection point position 4 | Inflection point position 5 |
|---|---|---|---|---|---|---|
| P1R1 | 1 | 1.425 | / | / | / | / |
| P1R2 | 1 | 1.055 | / | / | / | / |
| P2R1 | 1 | 1.015 | / | / | / | / |
| P2R2 | 2 | 0.625 | 0.985 | / | / | / |
| P3R1 | 1 | 1.135 | / | / | / | / |
| P3R2 | 2 | 1.055 | 1.285 | / | / | / |
| P4R1 | 1 | 0.595 | / | / | / | / |
| P4R2 | 1 | 0.585 | / | / | / | / |
| P5R1 | 3 | 0.625 | 1.025 | 1.195 | / | / |
| P5R2 | 1 | 0.515 | / | / | / | / |
| P6R1 | 0 | / | / | / | / | / |
| P6R2 | 1 | 1.425 | / | / | / | / |
| P7R1 | 3 | 0.315 | 0.655 | 0.875 | / | / |
| P7R2 | 3 | 0.415 | 1.995 | 2.335 | / | / |
| P8R1 | 3 | 0.815 | 2.195 | 2.405 | / | / |
| P8R2 | 5 | 0.965 | 2.175 | 2.595 | 2.855 | 2.925 |
| P9R1 | 1 | 1.835 | / | / | / | / |
| P9R2 | 2 | 0.805 | 3.795 | / | / | / |

TABLE 12

| | Number of arrest points | Arrest point position 1 |
|---|---|---|
| P1R1 | 0 | / |
| P1R2 | 1 | 1.395 |
| P2R1 | 0 | / |
| P2R2 | 0 | / |
| P3R1 | 0 | / |
| P3R2 | 0 | / |
| P4R1 | 1 | 0.945 |
| P4R2 | 1 | 1.005 |
| P5R1 | 1 | 1.345 |
| P5R2 | 1 | 0.775 |
| P6R1 | 0 | / |
| P6R2 | 1 | 1.705 |
| P7R1 | 1 | 1.025 |
| P7R2 | 1 | 1.395 |
| P8R1 | 1 | 1.595 |
| P8R2 | 1 | 1.505 |
| P9R1 | 1 | 2.995 |
| P9R2 | 1 | 1.735 |

Figure 10:
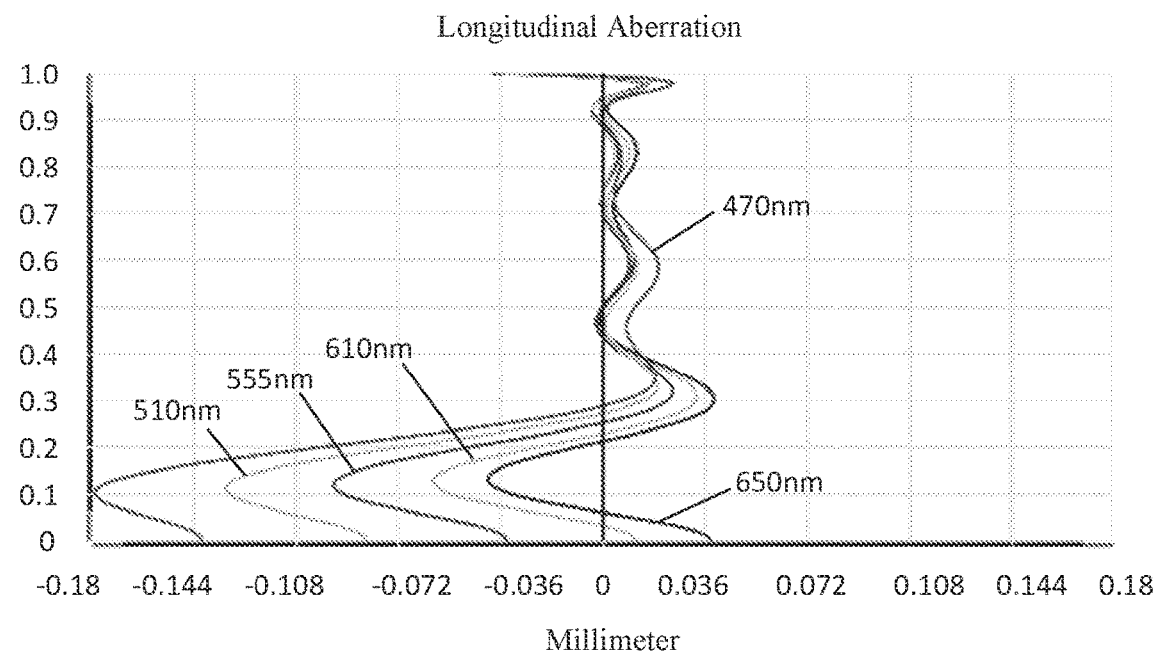
FIG. 10 is a schematic diagram of longitudinal aberration of the camera optical lens shown in FIG. 9.
Figure 11:
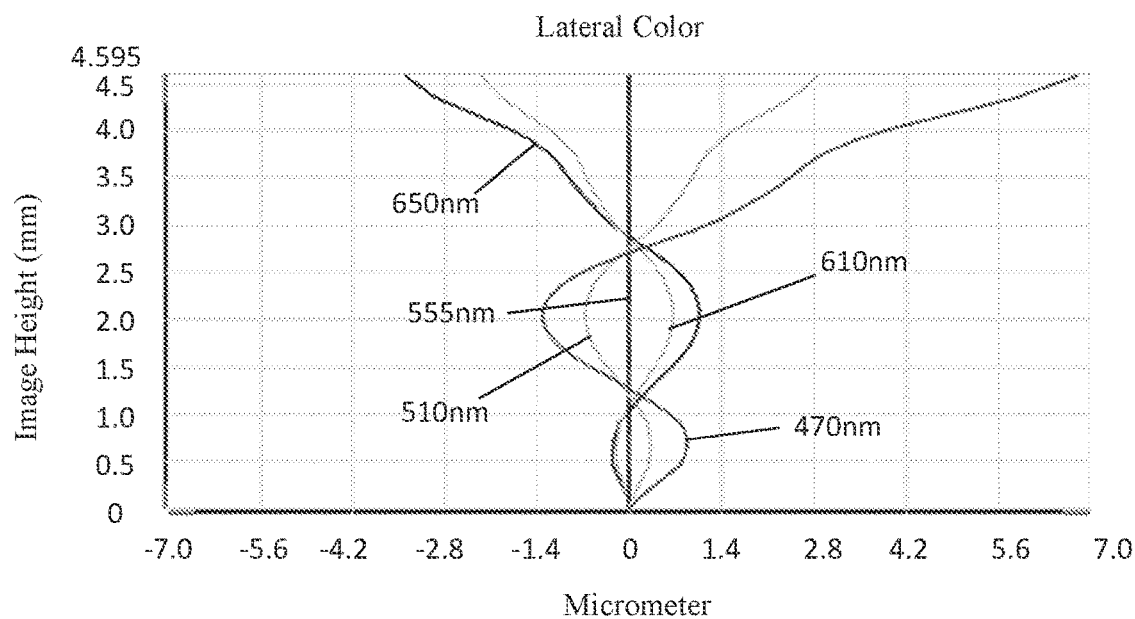
FIG. 11 is a schematic diagram of lateral color of the camera optical lens shown in FIG. 9.
Figure 12:
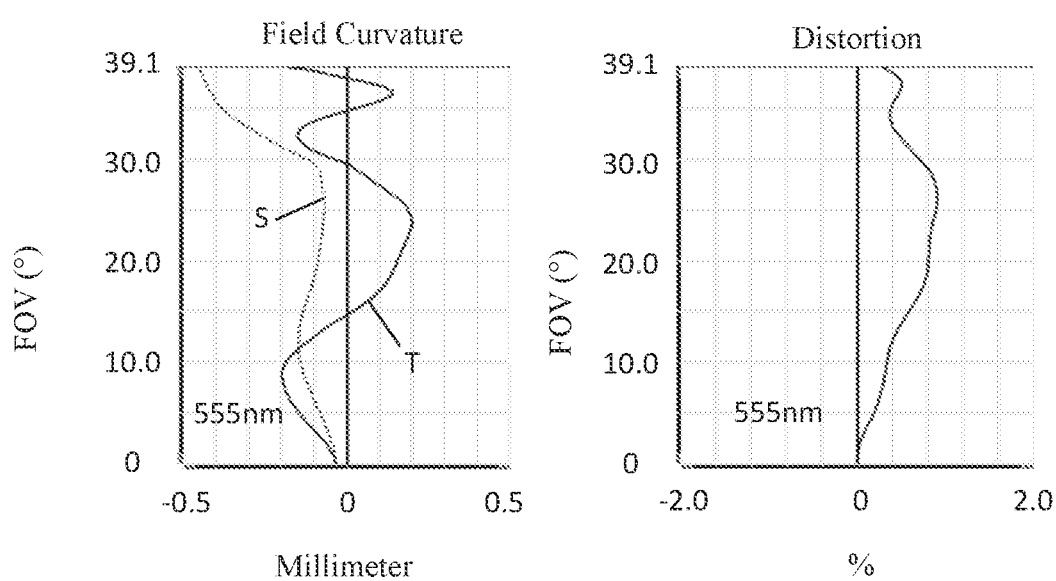
FIG. 12 is a schematic diagram of field curvature and distortion of the camera optical lens shown in FIG. 9.

FIG. 10 and FIG. 11 respectively illustrate schematic diagrams of a longitudinal aberration and a lateral color of light with wavelengths of 650 nm, 610 nm, 555 nm, 510 nm, and 470 nm after passing through the camera optical lens 30 in the Embodiment 3. FIG. 12 illustrates a schematic diagram of field curvature and distortion of light with a wavelength of 555 nm after passing through the camera optical lens 30 in the Embodiment 3.

Table 13 below includes values corresponding to the above conditions in this embodiment according to the above conditions. It is apparent that the camera optical lens in this embodiment satisfies the above conditions.

In this embodiment, the camera optical lens 30 has an entrance pupil diameter ENPD of 2.939 mm, an image height IH of full field of 4.595 mm, and the FOV (field of view) of 78.20° in a diagonal direction, such that the camera optical lens 30 meets design requirements for large aperture, wide angle and ultra-thinness while sufficiently correcting on-axis and off-axis chromatic aberration, thereby achieving excellent optical characteristics.

TABLE 13

| Parameters and Conditions | Embodiment 1 | Embodiment 2 | Embodiment 3 |
|---|---|---|---|
| f1/f | 2.20 | 3.50 | 4.85 |
| d3/d4 | 9.85 | 6.00 | 2.25 |
| f | 5.466 | 5.637 | 5.584 |
| f1 | 12.024 | 19.724 | 27.064 |
| f2 | −975062.460 | −100.000 | −20.000 |
| f3 | 23.561 | 13.270 | 10.071 |
| f4 | −157.064 | 103.573 | 37.304 |
| f5 | 38.547 | 142.071 | −227.296 |
| f6 | 26.198 | 17.275 | 9.375 |
| f7 | −12.168 | −7.734 | −4.211 |
| f8 | 4.791 | 3.996 | 3.099 |
| f9 | −3.936 | −4.034 | −4.229 |
| f12 | 11.445 | 22.541 | −112.533 |
| FNO | 1.90 | 1.90 | 1.90 |
| TTL | 6.911 | 7.000 | 7.424 |
| IH | 4.595 | 4.595 | 4.595 |
| FOV | 78.00° | 78.10° | 78.20° |

The above are only the embodiments of the present disclosure. It should be understand that those skilled in the art can make improvements without departing from the inventive concept of the present disclosure, and these improvements shall all belong to the scope of the present disclosure.

What is claimed is:

1. A camera optical lens, comprising, from an object side to an image side:
   a first lens having a positive refractive power;
   a second lens having a negative refractive power;
   a third lens;
   a fourth lens;
   a fifth lens;
   a sixth lens;
   a seventh lens;
   an eighth lens; and
   a ninth lens,
   wherein the camera optical lens satisfies following conditions:

$2.00 \leq f1/f \leq 5.00;$ $-22.67 \leq (R1+R2)/(R1-R2) \leq -3.33;$ $0.03 \leq d1/TTL \leq 0.09;$ and $2.00 \leq d3/d4 \leq 10.00,$ where
   f denotes a focal length of the camera optical lens,
   f1 denotes a focal length of the first lens,
   R1 denotes a central curvature radius of an object side surface of the first lens,
   R2 denotes a central curvature radius of an image side surface of the first lens,
   d1 denotes an on-axis thickness of the first lens,
   d3 denotes an on-axis thickness of the second lens,
   d4 denotes an on-axis distance from an image side surface of the second lens to an object side surface of the third lens, and
   TTL denotes a total optical length from the object side surface of the first lens to an image plane of the camera optical lens along an optic axis.

2. The camera optical lens as described in claim 1, further satisfying a following condition:

$1.50 \leq f6/f \leq 5.00,$ where f6 denotes a focal length of the sixth lens.

3. The camera optical lens as described in claim 1, further satisfying following conditions:

$$f2/fs-2.39;$$

$$3.19 \le (R3+R4)/(R3-R4) 60.59; \text{ and}$$

$$0.02 \le d3/TTL \le 0.11,$$

where f2 denotes a focal length of the second lens,
R3 denotes a central curvature radius of an object side surface of the second lens,
R4 denotes a central curvature radius of the image side surface of the second lens.

4. The camera optical lens as described in claim 1, further satisfying following conditions:

$$0.90 \le f3/fs \le 6.47;$$

$$-28.31 \le (R5+R6)/(R5-R6) \le -3.51; \text{ and}$$

$$0.02 \le d5/TTL \le 0.06,$$

where f3 denotes a focal length of the third lens,
R5 denotes a central curvature radius of the object side surface of the third lens,
R6 denotes a central curvature radius of an image side surface of the third lens,
d5 denotes an on-axis thickness of the third lens.

5. The camera optical lens as described in claim 1, further satisfying following conditions:

$$-57.47 \le f4/fs \le 27.56;$$

$$-35.82 \le (R7+R8)/(R7-R8) \le 28.73; \text{ and}$$

$$0.01 \le d7/TTL \le 0.04,$$

where f4 denotes a focal length of the fourth lens,
R7 denotes a central curvature radius of an object side surface of the fourth lens,
R8 denotes a central curvature radius of an image side surface of the fourth lens,
d7 denotes an on-axis thickness of the fourth lens.

6. The camera optical lens as described in claim 1, further satisfying following conditions:

$$-81.41 \le f5/fs \le 37.80;$$

$$-12.49 \le (R9+R10)/(R9-R10) \le 20.10; \text{ and}$$

where f5 denotes a focal length of the fifth lens,
R9 denotes a central curvature radius of an object side surface of the fifth lens,
R10 denotes a central curvature radius of an image side surface of the fifth lens,
d9 denotes an on-axis thickness of the fifth lens.

7. The camera optical lens as described in claim 1, further satisfying following conditions:

$$-1.81 \le (R11+R12)/(R11-R12) 2.00; \text{ and}$$

$$0.04 \le d11/TTL \le 0.13,$$

where

R11 denotes a central curvature radius of an object side surface of the sixth lens,
R12 denotes a central curvature radius of an image side surface of the sixth lens,
d11 denotes an on-axis thickness of the sixth lens.

8. The camera optical lens as described in claim 1, further satisfying following conditions:

$$-4.45 \le f7/fs - 0.50;$$

$$0.64 \le (R13+R14)/(R13-R14) \le 3.64; \text{ and}$$

$$0.03 \le d13/TTL \le 0.15,$$

where f7 denotes a focal length of the seventh lens,
R13 denotes a central curvature radius of an object side surface of the seventh lens,
R14 denotes a central curvature radius of an image side surface of the seventh lens,
d13 denotes an on-axis thickness of the seventh lens.

9. The camera optical lens as described in claim 1, further satisfying following conditions:

$$0.28 \le f8/fs \le 1.31;$$

$$-2.51 \le (R15+R16)/(R15-R16) \le -0.75; \text{ and}$$

$$0.04 \le d15/TTL \le 0.12,$$

where f8 denotes a focal length of the eighth lens,
R15 denotes a central curvature radius of an object side surface of the eighth lens,
R16 denotes a central curvature radius of an image side surface of the eighth lens,
d15 denotes an on-axis thickness of the eighth lens.

10. The camera optical lens as described in claim 1, further satisfying following conditions:

$$-1.51 \le f9/fs - 0.48;$$

$$0.27 \le (R17+R18)/(R17-R18) \le 0.98; \text{ and}$$

$$0.04 \le d17/TTL \le 0.12,$$

where f9 denotes a focal length of the ninth lens,
R17 denotes a central curvature radius of an object side surface of the ninth lens,
R18 denotes a central curvature radius of an image side surface of the ninth lens,
d17 denotes an on-axis thickness of the ninth lens.

11. The camera optical lens as described in claim 1, wherein the third lens has a positive refractive power, the sixth lens has a positive refractive power, the seventh lens has a negative refractive power, the eight lens has a positive refractive power and the ninth lens has a negative refractive power.

* * * * *